United States Patent [19]
Eckhoff

[11] Patent Number: 5,930,947
[45] Date of Patent: Aug. 3, 1999

[54] LANDSCAPE SYSTEM APPARATUS

[76] Inventor: Gerald J. Eckhoff, 8 Elmwood Dr., Hawthorn Woods, Ill. 60047

[21] Appl. No.: 08/914,488

[22] Filed: Aug. 19, 1997

[51] Int. Cl.$^6$ .................................................... A01G 1/08
[52] U.S. Cl. ............................................. 47/1.01; 47/33
[58] Field of Search ................................ 47/1.01, 31, 33; 52/102

[56] References Cited

U.S. PATENT DOCUMENTS

| | | | |
|---|---|---|---|
| D. 243,857 | 3/1977 | Hori | D25/80 |
| D. 276,494 | 11/1984 | Novak et al. | D8/1 |
| D. 315,026 | 2/1991 | Castonguay et al. | D25/113 |
| 348,598 | 9/1886 | Strickland . | |
| D. 351,072 | 10/1994 | Emalfarb et al. | D6/405 |
| D. 351,296 | 10/1994 | Emalfarb et al. | D6/405 |
| 2,282,559 | 5/1942 | Byers | 72/0.5 |
| 2,912,792 | 11/1959 | Venable | 47/33 |
| 3,277,624 | 10/1966 | Cornell | 52/484 |
| 3,415,013 | 12/1968 | Galbraith | 47/37 |
| 3,491,660 | 1/1970 | Kwasney | 94/31 |
| 3,520,082 | 7/1970 | Smith | 47/33 |
| 3,524,790 | 8/1970 | Mason | 161/37 |
| 3,561,181 | 2/1971 | Bassett | 52/309 |
| 3,712,825 | 1/1973 | Yocum | 117/8.5 |
| 3,762,113 | 10/1973 | O'Mullan et al. | 52/102 |
| 3,819,395 | 6/1974 | Yocum | 117/8 |
| 4,001,361 | 1/1977 | Unruh | 264/51 |
| 4,031,282 | 6/1977 | McClinton | 428/141 |
| 4,164,598 | 8/1979 | Wilhelm | 428/48 |
| 4,197,684 | 4/1980 | Johnson | 52/102 |
| 4,235,948 | 11/1980 | Holmes | 428/15 |
| 4,241,554 | 12/1980 | Infantino | 52/314 |
| 4,275,540 | 6/1981 | Keller | 52/314 |
| 4,553,366 | 11/1985 | Guerin | 52/487 |
| 4,647,491 | 3/1987 | Ireland et al. | 428/137 |
| 4,747,231 | 5/1988 | LeMay et al. | 47/33 |
| 4,747,238 | 5/1988 | Wikstrom et al. | 52/8 |
| 4,823,521 | 4/1989 | Kontz, Jr. | 52/102 |
| 4,884,920 | 12/1989 | Perazzi | 405/284 |
| 5,072,566 | 12/1991 | Zeidman | 52/608 |
| 5,092,076 | 3/1992 | Terreta | 47/33 |
| 5,117,583 | 6/1992 | Reum | 47/33 |
| 5,119,587 | 6/1992 | Waltz | 47/33 |
| 5,205,090 | 4/1993 | Lavery | 52/102 |
| 5,259,154 | 11/1993 | Lilley | 47/33 |
| 5,281,047 | 1/1994 | Skaug | 404/42 |
| 5,283,994 | 2/1994 | Callison | 52/71 |
| 5,317,833 | 6/1994 | Goldman | 47/33 |
| 5,359,817 | 11/1994 | Fulton | 52/288.1 |
| 5,375,941 | 12/1994 | Strobl, Jr. | 404/7 |
| 5,400,544 | 3/1995 | Wien | 47/33 |
| 5,405,211 | 4/1995 | Halwani | 404/46 |
| 5,467,555 | 11/1995 | Ripley, Sr. et al. | 47/66 |
| 5,497,841 | 3/1996 | Cox et al. | 175/11 |
| 5,535,563 | 7/1996 | Brown et al. | 52/235 |
| 5,542,787 | 8/1996 | Charlanow | 405/258 |
| 5,568,994 | 10/1996 | Dawson | 404/7 |
| 5,570,551 | 11/1996 | Koe, Sr. et al. | 52/314 |
| 5,588,262 | 12/1996 | Dawson | 52/102 |
| 5,615,529 | 4/1997 | Johnson et al. | 47/33 X |
| 5,640,801 | 6/1997 | Rynberk | 47/33 |
| 5,720,128 | 2/1998 | Smith et al. | 47/33 |

*Primary Examiner*—Jack W. Lavinder
*Assistant Examiner*—Yvonne R. Abbott
*Attorney, Agent, or Firm*—Factor and Shaftal

[57] ABSTRACT

An apparatus for forming a landscape system comprising a plurality of system members which edge and retain fill material and facilitate landscaping. Each system member includes a base plate, a front portion, a connecting member and an accepting member. The base plate includes a top surface, a bottom surface, a proximal end and a distal end. The base plate is configured to be substantially held in place by the fill material. The front portion includes a first side, a second side, an upper side and a lower side. The first side includes a first receiving member which is capable of releasable mating engagement with a second receiving member of another of the plurality of system members, and, the second side includes such a second receiving member capable of releasable mating engagement with a first receiving member of another of the system members. Such attachment facilitates horizontal engagement. The connecting member is capable of attachment with the accepting member of another of the plurality of system members, to, in turn, facilitate vertical engagement of the system members.

14 Claims, 3 Drawing Sheets

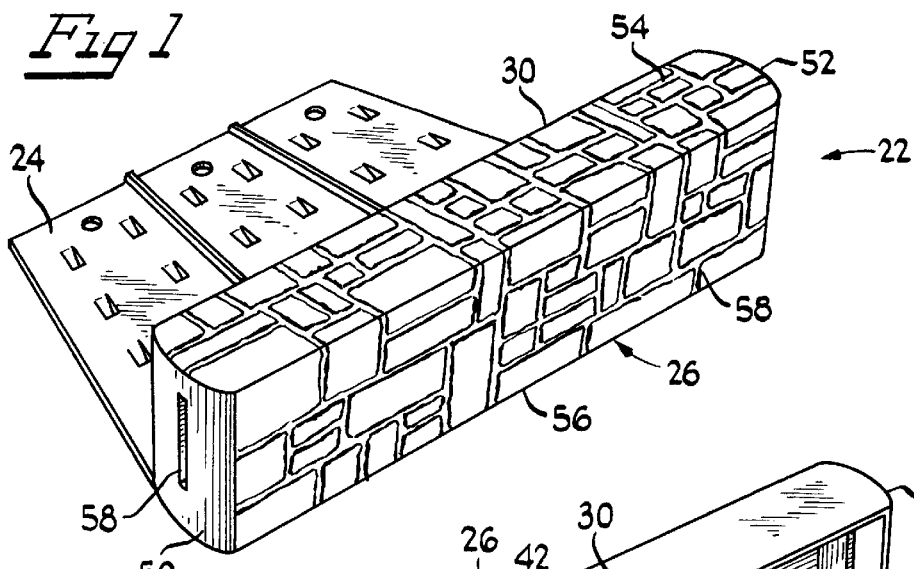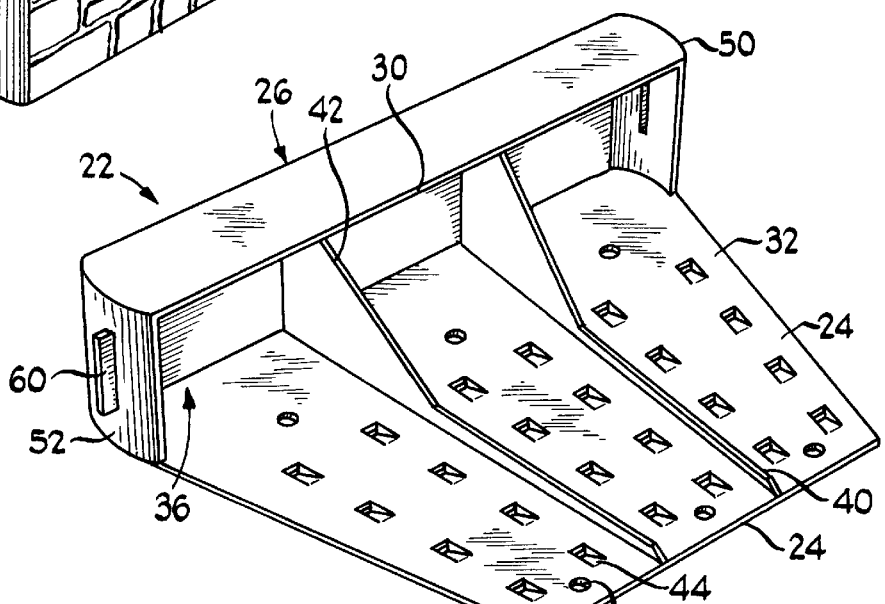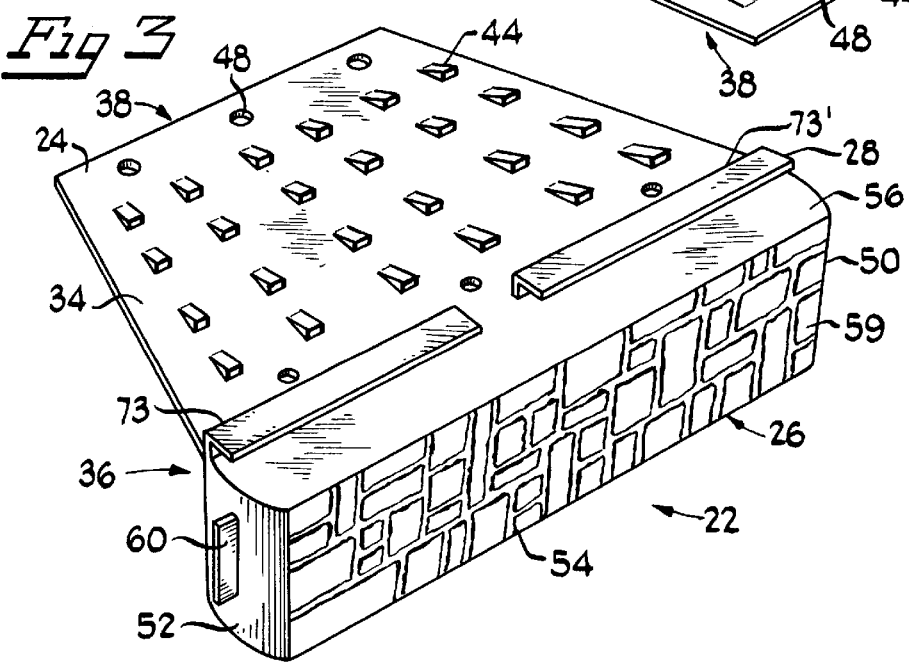

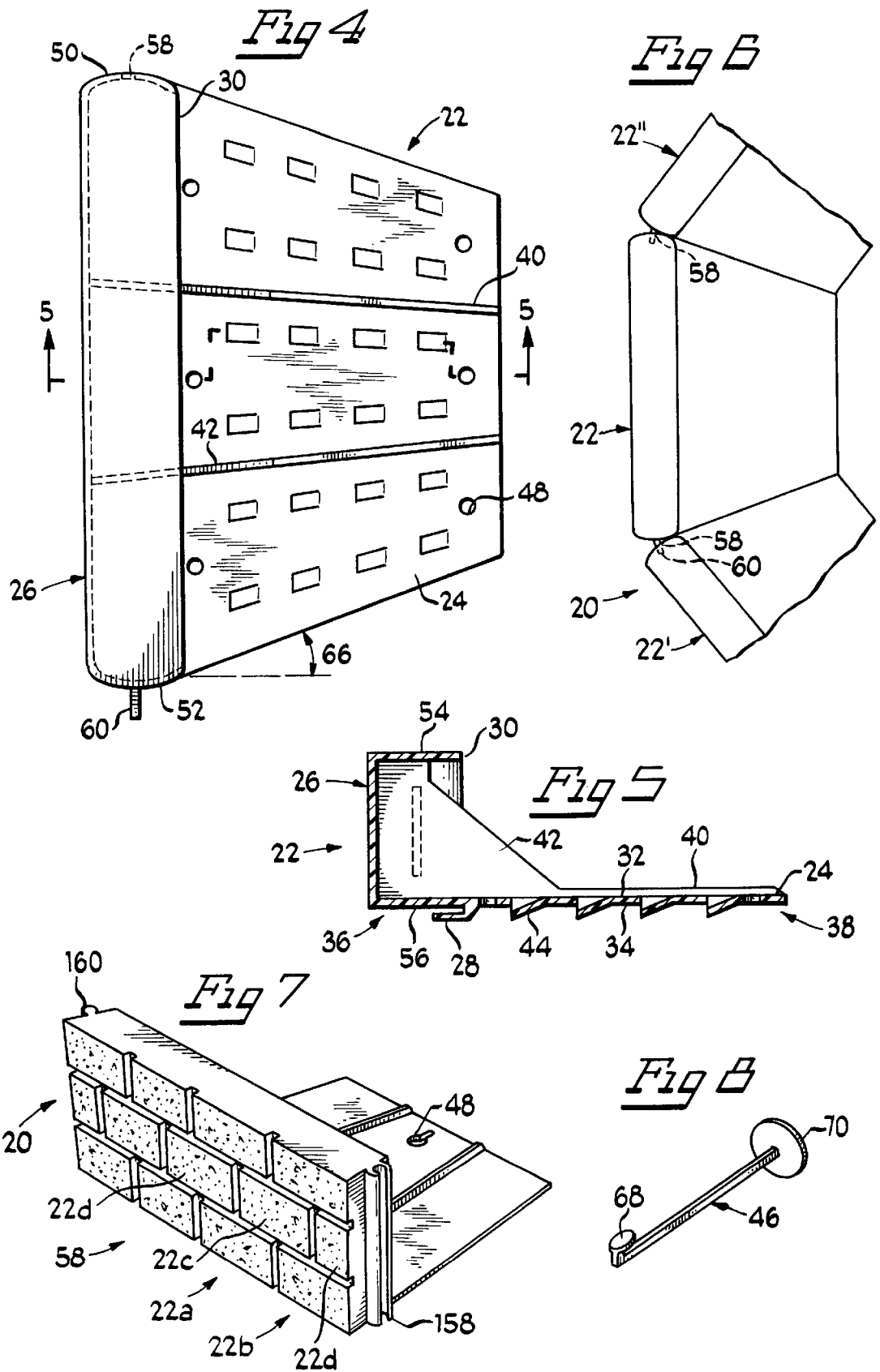

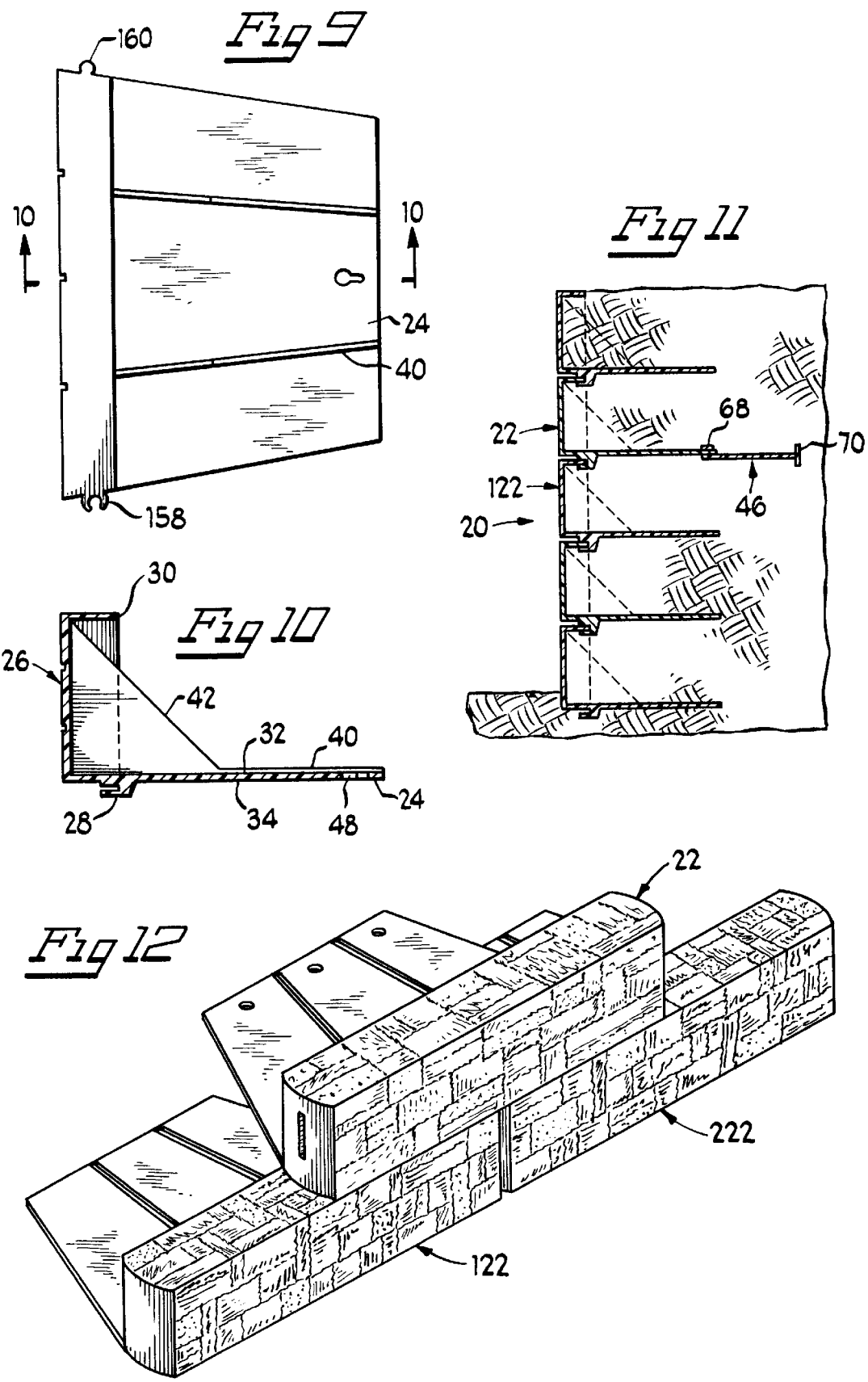

LANDSCAPE SYSTEM APPARATUS

BACKGROUND OF THE INVENTION

1. Field of the Invention

The present invention is directed to a landscape system and, more particularly to a landscape system comprising a plurality of system members which are used to edge and retain fill material and landscaping placed thereon. The multiple system members are, positioned to render to a horizontal (straight or curved) landscape system of any desired length, a vertical landscape system of varying height, and any combination thereof.

2. Background Art

The erection of walls and boarders in landscaping design is well known in the art. Not only do such landscape accents improve the appearance of the property, but these accents additionally serve to limit movement and migration of soil and fill material. Traditionally, these landscape features were made of masonry, such as bricks, rocks, stones, concrete slabs and the like. These traditional systems, while robust, have certain drawbacks. For example, they require much time to erect and, are often too difficult to be assembled by anyone other than a tradesman skilled in masonry work. Additionally, because of the weight of traditional systems, heavy equipment is often required for construction. Further, once erected, these systems are not easily reconfigured if the landscaping is redesigned.

Certain landscape systems have been used to develop low cost and easily assembled structures. While these structures can be installed by unskilled individuals, there are certain drawbacks. Some of these systems are not capable of being erected into a wall that has both horizontal and vertical integration of system members. Further, these structures often are not flexible enough to adapt to varying configurations and curvations. Additionally, they are generally not durable enough to be reused or to sustain extended use when exposed to harsh elements of the environment. Moreover, these systems often do not include an attractive appearance once constructed.

SUMMARY OF THE INVENTION

The invention comprises a landscape system that includes a plurality of system members which are used to add and retain fill material and landscaping placed therein. Each system member comprises a base plate, a front portion, a first side, at least one connecting member and at least one accepting member. The base plate includes a top surface, a bottom surface, a proximal end and a distal end. The base plate is configured so as to be capable of being substantially held in place by fill material. The front portion is associated with the base plate and includes a first side, a second side, an upper side, a lower side and a desired outer appearance. The first side includes a first receiving member and the second side includes a second receiving member. The first receiving member is capable of releasable mating engagement with the second receiving member of another plurality of system members, to, in turn, enable horizontal engagement of the system members. Likewise, the second receiving member is capable of releasable mating engagement with the first receiving member of another of the plurality of system members. This, in turn, likewise enables horizontal engagement of the system members. The connecting member is associated with at least one of the bottom surface of the base plate and lower side of the front portion. The accepting member is associated with one of the top sides of the front portion and the top surface of the base plate. The accepting member is capable of attaching with the connecting member of another one of the plurality system members. Thus, this facilitates releasable stackable orientation of the plurality of system members.

In a preferred embodiment, the base plate includes at least one stiffening rib spanning between the base plate and the front portion. Further, in our preferred embodiment, the system may further include at least one brace associate with a portion of the base plate and the front portion.

In another preferred embodiment, the width of the base plate is greater at the proximal end than at the distal end. Additionally, the base plate preferably includes at least one combination weep hole and sliding resistance cleat therethrough.

In another preferred embodiment, the base plate includes at least one anchor hole. In such an embodiment, the system further includes an anchor member having a first end adapted to releasably engage the anchor hole and a second end capable of attachment to an outside structure.

In yet another preferred embodiment, the desired outer appearance includes a surface configured to resemble natural rock, cut stone and/or masonry.

In yet another preferred embodiment, the releasable mating engagement of the first and second receiving members comprises rotatable mating engagement about a plane substantially parallel to the base plate.

Preferably, each of the plurality of system members are substantially identical in configuration.

The invention further comprises a method for forming a landscape system. The method comprises the step of (1) providing at least 3 system members, each having a first and a second receiving member; (2) positioning a first system member into a desired orientation; (3) connecting one of the first and second receiving members of second system member to the corresponding other of the first and second receiving member of the first system member; (4) positioning the second system member into a desired orientation; and (5) vertically connecting a connecting member of the third system member to the accepting member of at least one of the first system member and the second system member.

In a preferred embodiment, the method may further include the step of positioning a fourth system member on at least a portion of at least one of first side of the first system member, an upper side of the first system member, a second side of the second system member, an upper side of the second system member, a first side of the third system member, a second side of the third system member, and an upper side of the third system member.

In another preferred embodiment, the step of connecting the first and second system members comprises the step of rotating the second system member relative to the first system member about the first receiving member of the first system member and the second receiving member of the second system member.

In yet another preferred embodiment, the method further comprises the step of attaching an anchor member, or other anchoring system to at least one anchor hole.

Preferably, the method further comprises the step of placing a fill material on a top surface of a base plate of at least one of the first and second system members.

BRIEF DESCRIPTION OF THE DRAWINGS

FIG. 1 of the drawings is a front perspective view of the system member;

FIG. 2 of the drawings is a back perspective view of the system member;

FIG. 3 of the drawings is a bottom perspective view of the system member;

FIG. 4 of the drawings is a top plan view of the system member;

FIG. 5 the drawings is a cross-sectional view of the system member taken generally along lines 5—5 of FIG. 4;

FIG. 6 of the drawings is a top perspective view of the landscape system showing a first embodiment of the system members;

FIG. 7 of the drawings is a front perspective view of the landscape system showing a second embodiment of the system members;

FIG. 8 of the drawings is a front perspective view of the system member showing the anchor member;

FIG. 9 of the drawings is a top plan view of the system member;

FIG. 10 of the drawings is a cross-sectional view of the system member taken generally about lines 10—10 of FIG. 9;

FIG. 11 of the drawings is a side elevational view of the landscape system; and

FIG. 12 of the drawings is a front perspective of the landscape system.

DETAILED DESCRIPTION OF THE DRAWINGS

While the present invention is susceptible of embodiment in many different forms, there is shown in the drawings and will be described herein in detail, specific embodiments, with the understanding that the present disclosure is to be considered an exemplification of the principles of the invention, and is not intended to limit the invention to the embodiments illustrated.

Landscape system 20 is shown in FIGS. 6 and 11 as comprising a plurality of system members such as system member 22. Each system member 22 comprises base plate 24, front portion 26, connecting member 28 (FIG. 3), and accepting member 30. Each system member 22 is preferably constructed of single molded plastic structure and the system members are generally substantially identical in configuration. Of course, the use of different materials, such as metals, composites, wood, molded and cast materials such as prefabricated concrete, among others, along with differently dimensioned system members, is likewise contemplated.

Base plate 24 is shown in FIGS. 2, 3 and 5 as including top surface 32, bottom surface 34, proximal end 36, distal end 38, stiffening ribs such as stiffening rib 40, brace 42, weep hole 44, and anchor hole 48. As shown in FIGS. 1–4 and 6, the width of base plate 24 uniformly decreases from a wider first width at proximal end 36 to a narrower second width proximate distal end 38. However, the width of base plate 24 does not have to be tapered, so that the base plates of adjacent members could overlap to provide curving of system 20. Additionally, while various configurations are contemplated, top surface 32 and bottom surface 34 are substantially planar and generally parallel.

As shown in FIGS. 2 and 5, stiffening ribs 40 extend from proximal end 36 to distal end 38 of base plate 24, and, each stiffening rib may further be substantially perpendicular and attached to front portion 26. While other configurations are contemplated, rib 40 may be of uniform height or of varying height, as desired. Moreover, brace 42 may supplement the ribs or may be used without or in place of the ribs.

Weep holes, such as weep hole 44, as shown in FIGS. 2 and 5, extend through base plate 24 and are spaced in a linear pattern along the surface of base plate 24 to facilitate water drainage and aid against sliding. The total number of such weep holes can vary as to particular application or the particular environment in which the system member is to be used. Anchor holes 48, as shown in FIG. 7, comprise openings that extend through base plate 24. As will be explained, anchor holes 48 are configured to accept anchor member 46, stakes, or other systems.

Front portion 26 is shown in FIGS. 1, 3–5 as comprising first side 50, second side 52, upper side 54, lower side 56 and outer appearance 59 (FIGS. 1, 3). First side 50 includes first receiving member 58. Second side 52 includes second receiving member 60. As shown in FIG. 6, the receiving members are configured so that first receiving member 58 is capable of releasable mating engagement with second receiving member 60 of another of the plurality of system members 22. Additionally, the system members are permitted to rotate a predetermined extent relative to each other, about the receiving members. As shown in FIG. 7, Outward appearance 59 may comprise a surface which simulates a brick wall with bricks, such as bricks 22a, 22b, 22c and 22d.

Of course, other configurations are likewise contemplated such as releasable adhesion, Velcro, other snap-fit engagements, interference fit, slidable fit, as well as other means of engagement which permit such releasable, yet, rotatable engagement. For instance, in a second embodiment, as shown in FIGS. 7 and 9, first receiving member 58 may comprise female clip member 158 and second receiving member 60 may comprise male clip member 160. The female clip and male clip are capable of releasable mating engagement, and, the clips likewise facilitate limited pivoting of the system members relative to each other.

As shown in FIG. 3, connecting member 28 comprises J-shaped members 73 and 73'. The J-shaped members open in a direction substantially parallel to base plate 24. While the connecting member is shown as being integrated with front portion 26, it may likewise be attached to base plate 24.

Further, as shown in FIGS. 1–3, accepting member 30 comprises a region of front portion which is configured to engage connecting member 28, of another of system members 22. Additionally, front portion 26 and connecting member 28 may comprise differently configured structures which nevertheless facilitate engagement and receipt of a different one of the system members.

As shown in FIGS. 8 and 11, one such anchor member 46 includes pin 68 and resistance member 70. The anchor member may comprise a single molded member wherein pin 68 is configured to extend through anchor hole 48 of base plate 24. As will be explained, resistance member 70 may be substantially perpendicular to the front panel when installed. Thus, it aids in the retention of the system in the proper configuration.

In operation, it must first be determined how many system members 22 are to be assembled. In the case of assembly of a wall having both horizontal and vertical system members, a first system member 22 is positioned into a desired orientation. Next, as shown in FIG. 6, one of first receiving member 58' and second receiving member (not shown) of second system member 22' is connected to the corresponding other of the first receiving member 58 and second receiving member 60 of the first system member 22. As shown in FIG. 6, additional system members, as desired, such as system member 22", can be attached in a like manner. As explained above, and as shown in FIG. 6, first receiving member 58 and mating second receiving member 60 can pivot relative to each other so as to allow for multiple system members 22 to be arranged in a curve, or other non-linear configurations.

Subsequently, as shown in FIGS. 11 and 12, to vertically build the system a system member such as system member 22 must be positioned and vertically connected to system member 122 and system member 222 (FIG. 12). Specifically, as shown in FIG. 12, connecting member is matingly engaged with accepting member (not shown) of system member 122 and the accepting member of adjoining system member 222. Thus, a staggered appearance, much like that of bricks, can be achieved. Subsequent system members can likewise be stacked both vertically and horizontally as desired until the system is completed.

As the system members are added in each of the vertical and horizontal directions, fill material, as shown in FIG. 11, can be placed on the top surface of each of the system members. This fill material may comprise fill such as sand, gravel, black dirt and mulch, among others. The weight of the material additionally helps to maintain the system members in the desired orientation.

To further maintain the system members in the desired orientation, anchor member 46 may be utilized, as well as other systems. As shown in FIG. 11, pin 68 is extended through anchor hole 48 of base plate 24. Next, the outside material is positioned so that the anchor member 46 may be positioned horizontally, to, in turn, position resistance member 70 substantially vertical. Subsequently, outside material is placed to cover the anchor member. It is also contemplated that anchor member may be further secured to other outside structures, as desired, to further maintain the system members in the desired orientation.

The foregoing description and drawings merely explain and illustrate the invention and the invention is not limited thereto, as those skilled in the art who have the disclosure before them will be able to make modifications and variations therein without departing from the scope of the invention.

I claim:

1. A landscape system comprising a plurality of system members to be used to edge and retain fill material and landscaping placed therein, each member comprising:
    a base plate having a top surface, a bottom surface, a proximal end and a distal end;
    said base plate being further configured so as to be capable of being substantially held in place by said fill material;
    a front portion associated with the base plate, the front portion having a first side, a second side, an upper side and a lower side,
    said front portion having a desired outer appearance;
    the first side having a first receiving member, the second side having a second receiving member, the first receiving member capable of releasable mating engagement with the second receiving member of another of the plurality of system members; to, in turn, enable horizontal engagement of same; and the second receiving member capable of releasable mating engagement with the first receiving member of another of the plurality of system members; to, in turn, enable horizontal engagement of same;
    at least one connecting member associated with at least one of the bottom surface of the base plate and the lower side of the front portion; and
    at least one accepting member associated with of the upper side of the front portion and capable of attachment with the connecting member of another of the plurality of system members; to, in turn, facilitate vertically stackable orientation thereof.

2. The system according to claim 1 wherein said base plate includes at least one stiffening rib spanning between said base plate and said front portion.

3. The system according to claim 1 further including at least one brace associated with at least a portion of the base plate and the front portion.

4. The system according to claim 1 wherein the width of the base plate is greater at the proximal end than at the distal end.

5. The system according to claim 1 wherein the base plate includes at least one combination weep hole and sliding resistance cleat.

6. The system according to claim 1 wherein the base plate includes at least one anchor hole, the apparatus further comprising:
    an anchor member having a first end adapted to releasably engage the at least one anchor hole and a second end capable of attachment to an outside structure.

7. The system according to claim 1 wherein the front portion includes a surface configured to resemble at least one of the group consisting of natural rock, cut stone and masonry.

8. The system according to claim 1 wherein the releasable mating engagement of the first and second receiving members comprises rotatable mating engagement about a plane substantially parallel to the base plate.

9. The system according to claim 1 wherein each of the plurality of system members are substantially identical.

10. A method of forming a landscape system which comprises:
    (a) providing at least three system members, each member comprising:
        a base plate having a top surface, a bottom surface, a proximal end and a distal end;
        said base plate being further configured so as to be capable of being substantially held in place by said fill material;
        a front portion associated with the base plate, the front portion having a first side, a second side, and upper side and a lower side,
        said front portion having a desired outer appearance;
        the first side having a first receiving member, the second side having a second receiving member, the first receiving member capable of releasable mating engagement with the second receiving member of another of the least three system member; to, in turn, enable horizontal engagement of same; and the second receiving member capable of releasable mating engagement with the first receiving member of another of the at least three system members; to, in turn, enable horizontal engagement of same;
        at least one connecting member associated with at least one of the bottom surface of the base and the lower side of the front portion; and
        at least one accepting member associated with the upper side of the front portion and capable of attachment with the connecting member of another of the at least three system members; to, in turn, facilitate vertically stackable orientation thereof;
    (b) positioning a first system member into a desired orientation;
    (c) connecting one of the first and second receiving members of second system member to the corresponding other of the first and second receiving member of the first system member;

(d) positioning the second system member into a desired orientation; and (e) vertically connecting a connecting member of the third system member to the accepting member of at least one of the first system member and the second system member.

11. The method according to claim 10 further comprising the step of positioning a fourth system member on at least a portion of at least one of a first side of the first system member, an upper side of the first system member, a second side of the second system member, an upper side of the second system member, a first side of the third system member, a second side of the third system member, and an upper side of the third system member.

12. The method according to claim 10 wherein the step of connecting the first and second system member comprises the step of rotating the second system member relative to the first system member about the first receiving member of the first system member and the second receiving member of the second system member.

13. The method according to claim 10 further comprising the step of attaching an anchor member to at least one anchor hole.

14. The method according to claim 10 further comprises the step of placing a fill material on a top surface of a base plate of at least one of the first and second system members.

* * * * *

UNITED STATES PATENT AND TRADEMARK OFFICE
CERTIFICATE OF CORRECTION

PATENT NO. : 5,930,947

DATED : August 3, 1999

INVENTOR(S): Gerald J. Eckhoff

It is certified that error appears in the above-identified patent and that said Letters Patent are hereby corrected as shown below:

Col 5, Line 66                      After "with", delete "of".

Col 6, Line 55                      After "base", insert -- plate --.

Signed and Sealed this

Fourteenth Day of December, 1999

Attest:

Q. TODD DICKINSON

Attesting Officer          Acting Commissioner of Patents and Trademarks